(12) United States Patent
Eijkelenberg et al.

(10) Patent No.: US 7,234,278 B2
(45) Date of Patent: Jun. 26, 2007

(54) UNITARY OVERPRESSURE VENT PANEL STRUCTURE

(75) Inventors: Tom Eijkelenberg, Westerlo (BE); Guido Dom, Olen (BE); Roger Bours, Zoersel (BE)

(73) Assignee: Fike Corporation, Blue Springs, MO (US)

( * ) Notice: Subject to any disclaimer, the term of this patent is extended or adjusted under 35 U.S.C. 154(b) by 216 days.

(21) Appl. No.: 11/150,805

(22) Filed: Jun. 10, 2005

(65) Prior Publication Data

US 2005/0235576 A1    Oct. 27, 2005

Related U.S. Application Data

(63) Continuation of application No. 10/378,771, filed on Mar. 4, 2003, now abandoned.

(60) Provisional application No. 60/359,234, filed on Feb. 20, 2002.

(51) Int. Cl.
*E04B 1/00* (2006.01)

(52) U.S. Cl. ............... 52/99; 52/98; 52/100; 52/1; 220/89.1

(58) Field of Classification Search ............ 52/99, 52/1, 98, 100, 202, 209; 220/89.1
See application file for complete search history.

(56) References Cited

U.S. PATENT DOCUMENTS

| | | | |
|---|---|---|---|
| 3,091,359 A | 5/1963 | Wood | |
| 3,109,554 A | 11/1963 | Porter et al. | |
| 3,722,734 A | 3/1973 | Raidl, Jr. | |
| 3,972,442 A | 8/1976 | Malcolm | |
| 4,067,154 A | 1/1978 | Fike, Jr. | |
| 4,498,261 A * | 2/1985 | Wilson et al. | 52/1 |
| 4,612,739 A | 9/1986 | Wilson | |
| 4,662,126 A * | 5/1987 | Malcolm | 52/167.9 |
| 4,741,542 A | 5/1988 | Kimerly | |
| 4,777,974 A | 10/1988 | Swift et al. | |
| 4,787,180 A | 11/1988 | Robinson et al. | |
| 4,821,909 A | 4/1989 | Hibler et al. | |
| 5,022,424 A * | 6/1991 | Reynolds et al. | 137/68.27 |
| 5,036,632 A | 8/1991 | Short et al. | |
| 5,411,158 A | 5/1995 | Kays et al. | |
| D373,984 S | 9/1996 | Darien | |
| 5,558,114 A | 9/1996 | Strelow | |
| 5,720,380 A | 2/1998 | Graham, II | |

(Continued)

*Primary Examiner*—Jeanette E. Chapman
*Assistant Examiner*—Basil Katcheves
(74) *Attorney, Agent, or Firm*—Hovey Williams LLP (57) ABSTRACT

Unitary one-piece frameless overpressure vent panel assembly (10) includes a rigid, generally planar primary support member having a central relief opening (26), a rigid, generally planar secondary support member (44) provided with a central relief aperture (46), and a frangible vent panel (30) between the support members in full closing relationship to the relief opening and the aperture. A sealant element (48) may be provided between the vent panel and at least one of the support members in circumscribing relationship to the relief opening or aperture. At least one line of weakness (34) may be provided in the vent panel. A flexible gasket (58) secured to the secondary support member assures a fluid tight seal between the vent panel assembly and the structure defining a protected zone. Alternatively, a knife blade or the like may be provided adjacent the vent panel to effect severing thereof under a predetermined overpressure in lieu of a line of weakness in the panel.

14 Claims, 5 Drawing Sheets

U.S. PATENT DOCUMENTS

| | | |
|---|---|---|
| 5,906,288 A | 5/1999 | Dwinell |
| 5,967,170 A | 10/1999 | Hume et al. |
| 6,029,933 A | 2/2000 | Holman et al. |
| 6,070,365 A * | 6/2000 | Leonard .......................... 52/1 |
| 6,367,203 B1 * | 4/2002 | Graham et al. ................. 52/1 |
| 6,499,439 B1 | 12/2002 | Kohler et al. |
| 6,607,003 B1 | 8/2003 | Wilson |
| 6,711,861 B2 | 3/2004 | Berger, Jr. |
| 6,959,828 B2 * | 11/2005 | Eijkelenberg et al. ..... 220/89.2 |

* cited by examiner

UNITARY OVERPRESSURE VENT PANEL STRUCTURE

RELATED APPLICATION

This application is a continuation of U.S. patent application Ser. No. 10/378,771 filed Mar. 4, 2003 now abandoned, entitled UNITARY OVERPRESSURE VENT PANEL STRUCTURE, incorporated herein by reference, that claimed the benefit of Provisional Application Ser. No. 60/359,234, filed Feb. 20, 2002, and entitled UNITARY FRAMELESS EXPLOSION VENT PANEL STRUCTURE.

BACKGROUND OF THE INVENTION

1. Field of the Invention

This invention relates to a unitary, one-piece, integrated, non-fragmenting overpressure vent panel assembly that may be installed in covering relationship to the pressure relief area of a combined zone to be protected from the buildup of uncontrolled overpressures, and to then be removed as a unit for replacement with a similar vent panel assembly after actuation thereof. The vent panel assembly is especially useful for instantaneously venting dangerously high internal pressures which result from an explosion in a manner to preclude catastrophic buildup of pressures within a confined area that is normally exposed to relatively low operating pressures. The vent panel assembly has utility for use in protecting equipment such as bag house dust collectors, cyclones, conveyors, bucket elevators, dryers, vacuum receivers, electrostatic precipitators, silos, storage bins, large pipes, and ducting.

2. Description of the Prior Art

Burst membranes or panels have been used for many years to provide protection against explosions producing unpredictable dangerously high internal pressures which not only would be destructive to the zone requiring protection, but also to surrounding equipment, processes and personnel. The burst panels are fabricated to rupture at a predetermined overpressure in order to vent the protected zone and prevent the buildup of pressures therein which in the case of an explosion could completely destroy the structure defining the protected zone.

Deployment of explosion vents has significantly increased in recent years because of the promulgation of ever more strict government regulations regarding the level of permissible particulates emissions that may be discharged into the atmosphere. The mandated adoption of dust collectors has correspondingly increased the risk of explosion inherent in the provision of such dust collecting equipment. The rise in the number of explosions attributable to particulates explosion has made it incumbent upon industry to provide effective means for adequately controlling the explosion problem. The need for explosion protection with improved dust collection equipment is exacerbated by the fact that the dust collectors tend to be less rigidly constructed and not as able to withstand internal explosions than was once the case. As a result, vent panels for venting the interior of dust collection apparatus must reliably rupture at a relatively low pressure in order to adequately vent the confined area to be protected before excessive pressure has built up within that area.

Examples of explosion vent devices that have been previously proposed include the vent panels and burst membranes illustrated and described in the assignee hereof U.S. Pat. Nos. 4,067,154, 4,662,126, 4,777,974, 4,821,909 and 6,070,365. Although these vent units have been found to be satisfactory for protection of a variety of dust collection applications where there is exposure to an unpredictable catastrophic explosive event, the prior vent panel devices have involved a multiplicity of parts which must be assembled in place over the vent opening of the confined zone to be protected, and to then be disassembled piece by piece upon venting of the burst panel of the explosion vent for replacement of the burst panel.

Typically, the operator of the dust collecting equipment has been responsible for providing suitable frame structure for receiving a burst panel with the supplier of the panel furnishing a burst membrane which complies with the dimensional specifications of the user's mounted in place frame structure. In the case of an initial installation, it is not uncommon for the burst panel supplier to provide the user with dimensional specifications for fabrication of frame structure required to mount a burst panel of standard configuration and dimensions established by the supplier. The burst panel is then mounted in place on the structure to be protected using hardware and fasteners supplied by the user.

Upon actuation of a burst panel by an overpressure condition in the structure to be protected, the actuated burst panel had to be removed from the structure defining a confined zone part by part, usually involving a number of steps and disconnection of a series of fasteners such as bolts and the like. Replacement of the panel required the same number of operations and steps to refit another burst panel over the pressure relief opening in the dust collecting structure.

SUMMARY OF THE INVENTION

It is a primary object of this invention to provide a unitary, integrated, one-piece overpressure vent panel assembly which may be installed over and removed as a unit from a pressure relief area of a confined zone to be protected from buildup of uncontrolled overpressures.

In a preferred embodiment, the unitary vent panel assembly includes a rigid, generally planar primary support member having a central pressure relief opening, a frangible vent panel carried by the primary support member in full closing relationship to the relief opening, a rigid, generally planar secondary support member overlying the vent panel and having a central relief aperture, and structure interconnecting the primary support member, the vent panel and the secondary support member to provide a rigid, integrated, one-piece overpressure vent panel assembly. In one form of the invention, the frangible vent panel is provided with a line of weakness defining a non-fragmenting burst pattern of the panel when the panel is subjected to an overpressure of predetermined magnitude.

The structure interconnecting the primary support member, the vent panel and the secondary support member may take any one of a number of forms including for example, a series of spaced rivets extending through the support members and the vent panel and positioned around the perimeter of the relief opening and the primary support member and the aperture in the secondary support member. Alternatively, the periphery of the panel may be laser welded to either the primary support member or the secondary support member or both. In instances of relatively low temperature applications, an adhesive layer may be used to affix the panel to one or both of the support members.

A fluid tight seal should be provided between the panel and one or both of the support members in full surrounding relationship to the relief opening in the primary support member and the aperture in the secondary support member.

A sealant element preferably of cross-sectional tubular configuration and containing a gaseous fluid may be provided between the panel and at least one of the support members which extends around the full perimeter of the relief opening and the aperture in respective support members. A planar spacer member in the form of an apertured plate is provided in association with the sealant element between the panel and a corresponding support member to prevent undue compression of the sealant element and thereby maintain the integrity of the seal over extended periods of time. As a result of the provision of the spacer member, a constant space is maintained between the rupture panel and the opposed secondary support member resulting in the sealant element always being compressed to the same degree regardless of the force applied in initial assembly of the vent panel assembly, or during in field work on the assembly. The sealant element always substantially returns to its original state because of its elastic memory when it is necessary to replace an actuated vent panel. In cases where the panel is welded to one of the support members around the periphery of the panel or a substantially non-compressible adhesive is used to join the primary support member to the secondary support member, the spacer plate normally provided in surrounding relationship to a sealant element may be omitted.

The overall configuration of the unitary overpressure vent panel assembly hereof may be of quadrate overall shape, either rectangular or square, or may be of circular configuration. The relief opening in the primary support member and the aperture in the secondary support member generally will be of a shape complemental with the overall shape of the assembly.

The panel may be fabricated of various materials and thicknesses depending on the burst pressure required for a specific use. Typically, the panel is of a corrosion resistant material such as stainless steel or exotic alloys with the configuration of the score pattern and the depth of the score cooperating to assure opening of the panel to meet an overpressure specification.

Although the rigid, integrated, one-piece overpressure vent panel assembly of this invention has primary and advantageous utility for protecting confined areas from uncontrolled explosions within the interior of the area, the one-piece assembly may also be used for relatively low pressure applications in which it is desirable or necessary to vent an area whenever a predetermined overpressure condition less than that occurring where an explosion hazard exists. In addition, in those applications where the required protective burst pressure is so low that full opening of the vent panel assembly may not be readily obtainable, especially if the vent panel of the vent assembly is not provided with burst pattern defining lines of weakness, one or more sharp knives or the like may be associated with the panel for effecting rupture thereof upon excursion of a relatively thin panel when a predetermined overpressure is applied to the vent.

The provision of a rigid, planar, spacer of predetermined thickness in surrounding relationship to the sealant element is torque independent thus preventing too high or too low torque pressures being applied to the vent panel during fabrication thereof as a result of overtightening or not applying sufficient tightening force to the mounting bolts of the vent panel assembly. In addition, a sleeve may be provided around each of the bolts securing the unitary vent panel assembly to the supporting structure of the confined area to prevent application of excessive force to a gasket between the secondary support member of the unitary vent panel assembly and the support frame on the bag house, vessel or other area structure to be protected.

Burst pressure controlling slots in the vent panel are preferably disposed in positions such that they are all located beneath the primary support member and communicate with the surrounding atmosphere and not the confines of the structure to be protected. As a consequence, the vent panel is not subjected to higher temperatures that may be present within the processing vessel or other apparatus thus precluding the vent panel from being adversely affected by elevated temperature applications. In addition, the vent panel cannot be touched, damaged or deformed during handling or installation.

In an alternate form of the invention, especially useful for vacuum condition applications, the vent panel may be provided with an outwardly projecting peripheral flange portion configured to meet with an integral, upstanding flange forming a part of the primary support member and surrounding the relief opening in the primary support member. A series of elongated relief tabs may be provided between the flange of the vent panel and the flange of the primary support member for controlling bursting of the panel under a predetermined overpressure. Each of the relief tabs has a pair of openings, with one of the openings being joined by pin means or the like to the flange of the primary support member while the other opening of the relief tab is connected to the flange of the vent panel. The burst pressure of the panel can be controlled by varying the material of construction, the thickness, and the width of the relief tab between respective openings therein. Since the relief tabs separate and permit the vent panel to be released only when a tension force is applied to the tabs sufficient to permit rupture thereof, the vent panel is especially adapted for vacuum conditions in that release tabs are subjected to a separation force only when an overpressure occurs in a direction applying a tension force to the release tabs.

DETAILED DESCRIPTION OF ONE EMBODIMENT OF THE INVENTION

Figure 1:
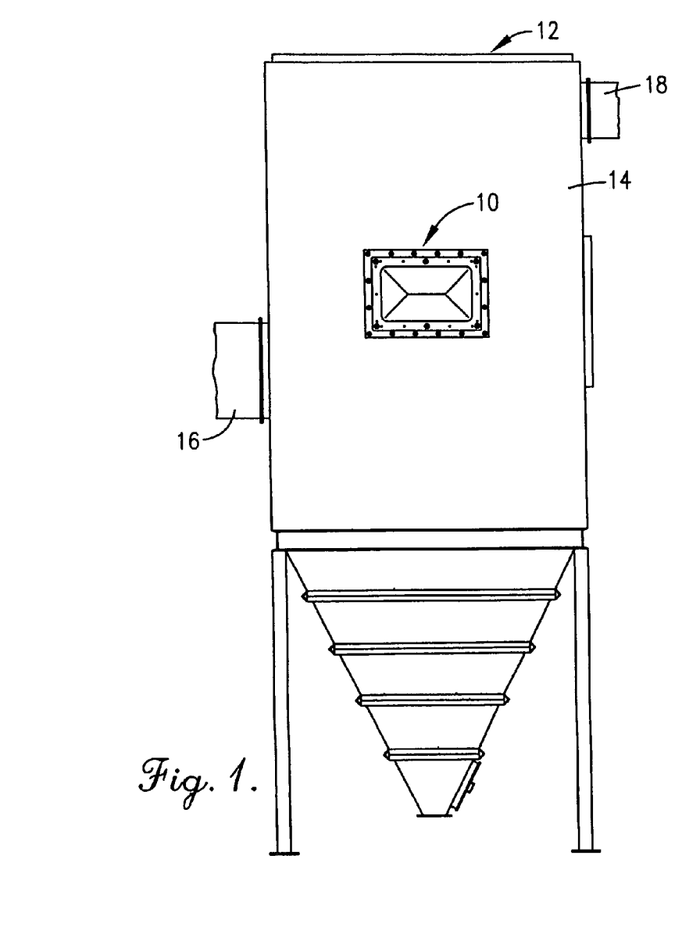
FIG. 1 is a side elevational, generally schematic representation of a particulates collector such as a conventional bag house and illustrating a unitary overpressure vent panel assembly of this invention mounted on one of the sidewalls of the bag house.
Figure 2:
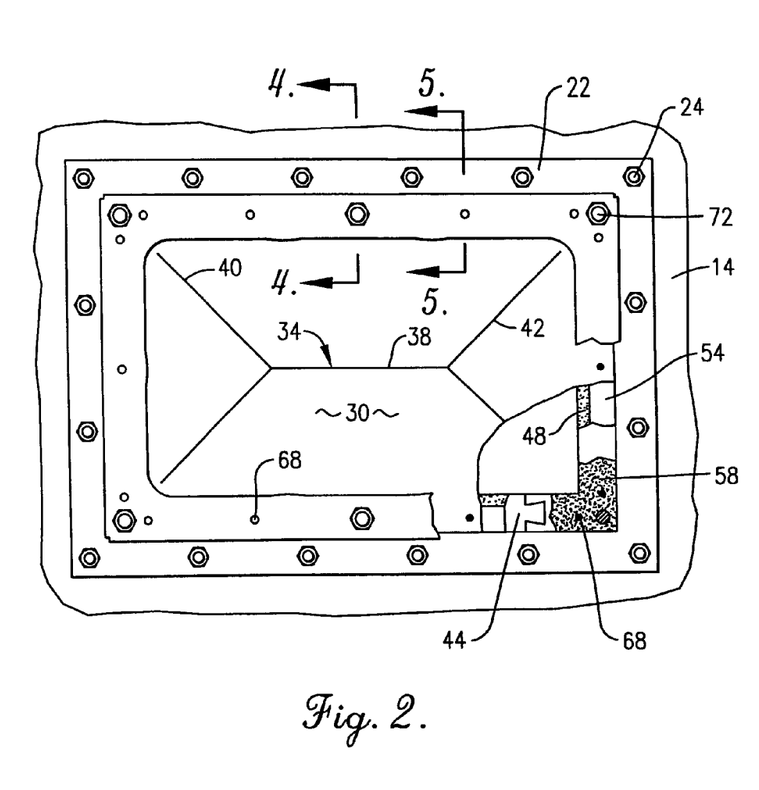
FIG. 2 is a fragmentary enlarged plan view of the unitary overpressure vent panel assembly as depicted in FIG. 1, with parts being broken away for clarity.

The principal, although not exclusive, utility for the rigid, integrated, one-piece overpressure vent panel assembly hereof is in explosion protection applications. To that end, the unitary overpressure vent panel assembly 10 as shown in the drawings is illustrated in operative position in a typical installation such as the upright side wall 14 of a particulates collector in the nature of a bag house 12 having an inlet 16 and an outlet 18. Bag house 12 conventionally is provided with a plurality of filters which for example may be loosely woven fabric bags mounted over respective outlet conduits which communicate with the interior of structure 12.

It is to be understood that mounting of unitary overpressure vent panel assembly 10 on the side wall 14 of bag house 12 is for illustrative purposes only and the assembly 10 may be positioned in any one of a number of strategically determined locations depending upon the type of confined zone to be protected from an explosion, the location of the structure on which the overpressure vent panel assembly 10 is to be mounted, and avoidance of the explosive force through the open vent undesirably impinging on adjacent equipment.

The preferred overpressure vent panel assembly 10 as illustrated in FIGS. 1-5 is of overall quadrate configuration. Accordingly, the side wall 14 of bag house 12 is provided with a rectangular opening 20. A vent panel mounting frame 22 is fixedly secured to side wall 14 in surrounding relationship to opening 20 through means such as a series of bolts 24. It is to be understood in this respect that frame 22 may be welded to the side wall 14 or otherwise permanently secured to the wall structure.

Explosion vent panel assembly 10 includes a rigid, generally planar primary quadrate support member 26 having a central rectangular relief opening 28. Member 26 preferably is of stainless steel, carbon steel or exotic alloys, with an exemplary construction having a thickness approximately 0.08". It is to be observed from FIGS. 4 and 5 that primary support member 26 has an integral peripheral lip 29 that may for example be about 0.4" wide and which extends around the entire perimeter of the planar portion of member 26 for increasing the rigidity of the member 26. The width of each side of support member 26 between the corresponding lip 29 and the inside edge of relief opening 28 may for example be about 1¾". The overall area of relief opening 28 varies depending upon the application of overpressure vent panel assembly 10 and the area that must be vented in the event of an explosive event within the confines of a protected area such as the internal volume of bag house 12.

Figures 3, 6:
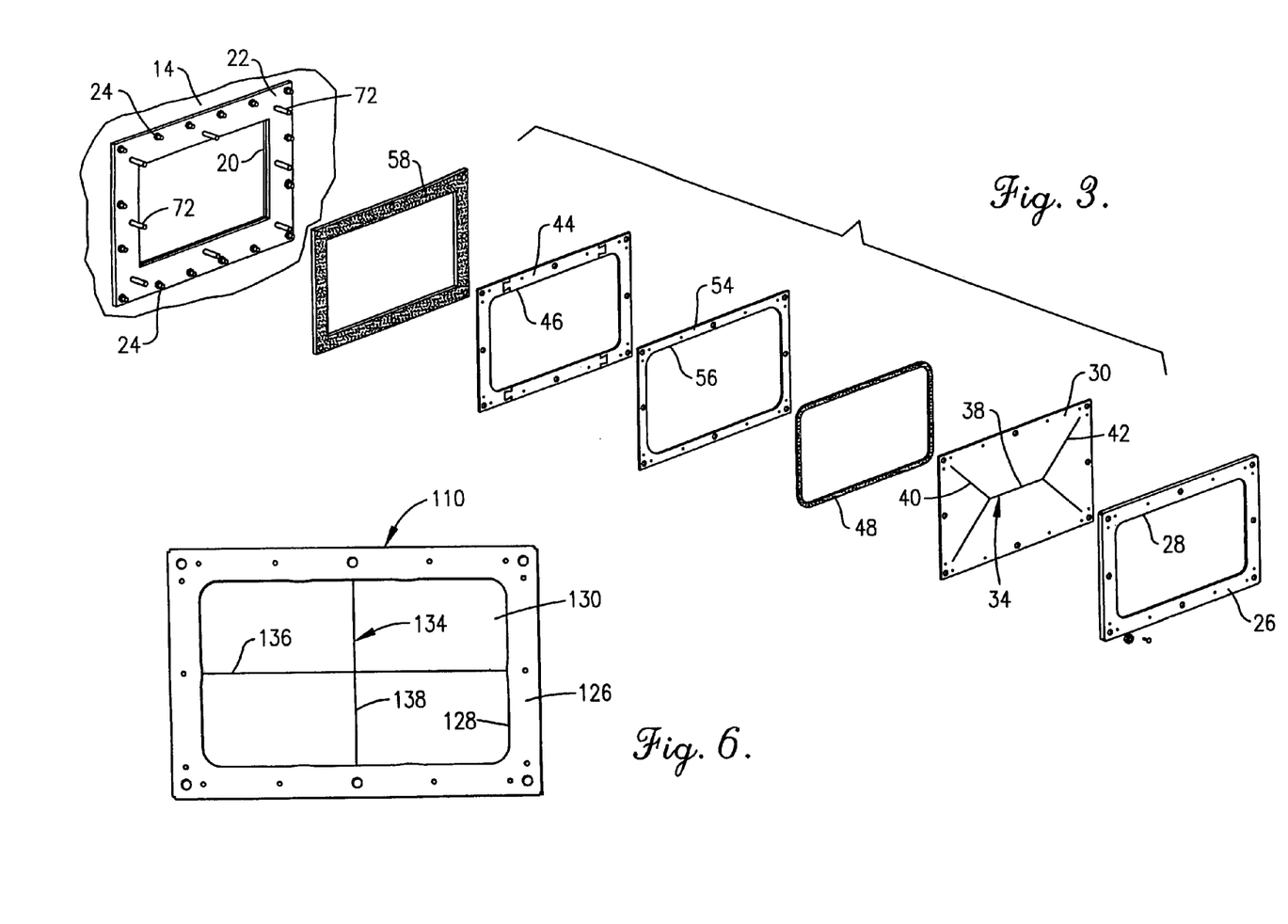
FIG. 3 is a perspective exploded view of the vent of the unitary overpressure vent panel assembly with the mount therefore forming a part of the bag house also being illustrated.
FIG. 6 is a plan view of an alternate embodiment of the overpressure vent panel assembly illustrating another score line configuration of the panel.
Figure 4:
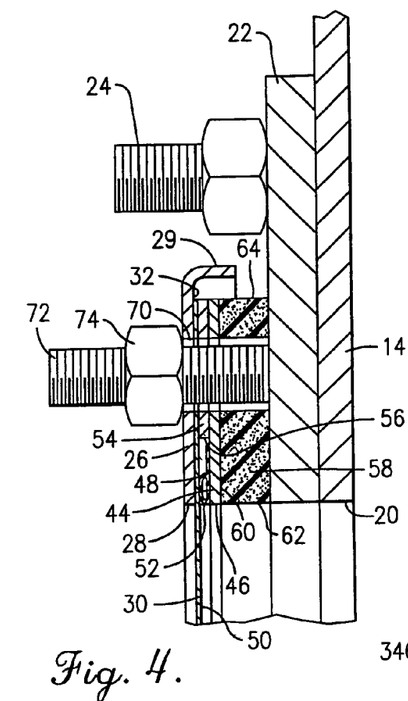
FIG. 4 is an enlarged, fragmentary, vertical cross-sectional view taken along the line 4-4 of FIG. 2 and looking in the direction of the arrow.
Figure 5:
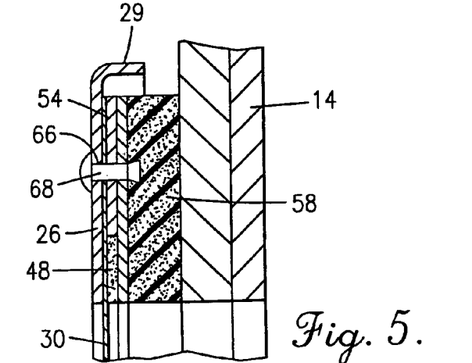
FIG. 5 is an enlarged, fragmentary, vertical cross-sectional view taken along the line 5-5 of FIG. 2 and looking in the direction of the arrows.

A vent panel 30 is mounted against the interface 32 of primary support member 26 within the quadrate margin defined by lip 29 as shown for example in FIGS. 4 and 5. Panel 30 may be of varying materials, including for example, stainless steel or other exotic alloys. Generally, panel 30 is provided with a score line in one face thereof which in cooperation with the material from which panel 30 is fabricated and the thickness of that material determines the overpressure at which the panel will burst and relieve the pressure buildup within the confined area to be protected such as the interior of bag house 12. In the embodiment of the explosion vent panel assembly shown in FIGS. 1-5, the score pattern 34 shown for exemplary purposes only, includes an elongated central score line segment 38 connected to opposed V-shaped segments 40 and 42 at opposite ends of line segment 38. The depth of score pattern 34 is a function of the burst pressure at which the vent panel 10 must open and varies from job to job.

A rigid, generally planar secondary quadrate support member 44 is mounted within the confines of primary support member 26 adjacent the interface 32 thereof and preferably is of stainless steel, carbon steel or an exotic alloy also having a thickness of about 0.08" where the primary support member 26 is fabricated of material of that thickness. Support member 44 has a central rectangular aperture 46 therein of dimensions approximately equal to the dimensions of relief opening 28 in primary support member 26. Each side of secondary support member 44 is of a width such that the outer perimeter thereof is approximately the same dimensions as the outer dimensions of panel 30 as shown in FIGS. 4 and 5.

Figures 4A, 10A, 11, 12, 13, 14:
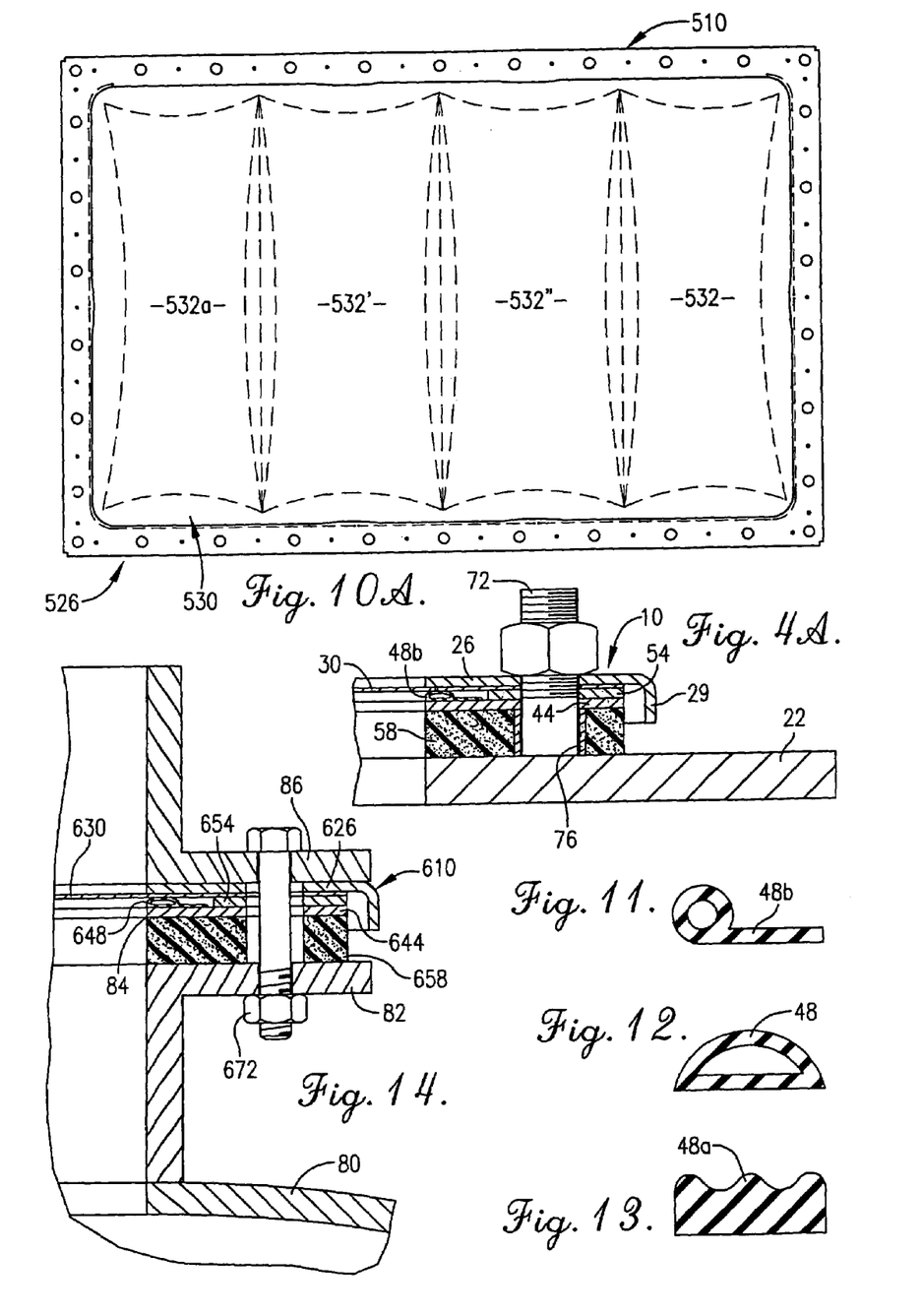
FIG. 4A is a vertical cross-sectional view along the same line as FIG. 4 and illustrating the preferred tubular sealant element between the vent panel and the spacer plate.
FIG. 10A is a plan view of the overpressure vent panel assembly of FIG. 10.
FIG. 11 is an enlarged cross-sectional view of an exemplary uncompressed tubular, flexible element as shown in FIG. 4A.
FIG. 12 is an alternate tubular element that may be used in lieu of tubular element shown in FIGS. 4A and 11.
FIG. 13 is another alternate tubular element that may be used in place of tubular elements shown FIGS. 11 and 12.
FIG. 14 is an enlarge fragmentary cross-sectional view of a vessel having a cylindrical process flange in which a circular unitary overpressure vent panel assembly is clamped between the flange of the vessel and the flange of an outlet conduit.

A transversely tubular element 48b of flexible sealant material trapping a quantity of a compressible fluid such as air is provided as shown in FIG. 4A between the inner face 50 of panel 30 and the opposed face 52 of secondary support member 44. An enlarged cross-sectional view of element 48b is illustrated in FIG. 11. Another exemplary tubular, flexible element 48, is shown in enlarged cross-section in FIG. 12. A non-tubular, flexible sealant element 48a as depicted in FIG. 13 and illustrated schematically in FIG. 4 may also be used for providing a seal between panel 30 and secondary support member 44. Sealant element 48b may either be of synthetic foam resin material, or a sufficiently flexible solid polymer for use in this application. A rigid, generally planar, quadrate spacer plate 54 is provided between face 50 of panel 30 and the opposing face 52 of secondary support member 44 in surrounding relationship to the element 48. The thickness of plate 54 is chosen to assure that flexible element 48 is compressed only to a predetermined extent to assure that an adequate seal is provided between the process side and the atmospheric side of the vent panel assembly 10 around the perimeter of the vent panel 30 under the normal operating conditions within the protected confined area likely to be encountered for that specific application. The flexible sealant element 48 may be constructed of various materials including silicone, Teflon, EPDM, Viton, and other equivalent compounds. In all instances the sealant element 48 should be of a thickness such that in its compressed state the sealant element will be maintained in full sealing engagement with face 50 of panel 30 in opposition to face 52 of secondary support member 44. In an exemplary embodiment the spacer plate 54 may also be about 0.08" thick. It can be seen from FIGS. 4 and 5 that spacer plate 54 has an outer peripheral edge generally co-extensive with the outer margins of panel 30 and secondary support member 44, while the inner rectangular opening 56 of spacer plate 54 is spaced outwardly from the edge of secondary support member 44 defining aperture 46. The flexible sealant material defining element 48 should be of composition such that it will remain flexible at the operating temperature within the confines of bag house 12 and to remain flexible for an extended period of time which typically is the norm before vent panel 30 is actuated as a result of an explosive event within the bag house 12.

A flexible, quadrate gasket 58 is adhesively secured to the outer face 60 of secondary support member 44 and has a central rectangular opening 62 of dimensions approximately equal to the dimension of aperture 46 in secondary support member 44. The gasket 58 is preferably of synthetic resin tubular foam or other sealing material and in one embodiment may have a nominal thickness before compression of about 0.35". The outer peripheral margin 64 of gasket 58 is generally complemental with the outer perimeter of secondary support member 44.

The primary support member 26, panel 30, spacer plate 54 and secondary support member 44 have a series of aligned throughholes 66, each of which receives a respective rivet 68 for rigidly interconnecting the assembly of primary support member 26, panel 30, spacer plate 54 and secondary support member 44. The preferred pattern of rivets 68 which interconnect primary support member 26, panel 30, spacer plate 54 and secondary support member 44 is illustrated for example in FIG. 2. The spacer plate 54 provides a continuous space of uniform distance between the opposing surfaces of spacer plate 54 and panel 30 so that during fabrication of vent panel assembly 10, predetermined compression of the sealant element 48 will uniformly be obtained.

The overpressure vent panel assembly 10 also is provided with a plurality of openings 70 therein for receiving fasteners such as bolts 72 carried by mounting frame 22 which serve to releasably affix assembly 10 to mounting frame 22. Cylindrical spacers 76 (FIG. 4A) surrounding each of the bolts 72 and of less height that the uncompressed thickness of gasket 58 assure that the gasket 58 is compressed to a predetermined extent upon initial installation of the vent panel assembly 10 and to the same degree of compression each time a replacement vent panel assembly 10 is mounted on support frame 22.

The primary support member 26 is provided with a series of spaced, integral lugs 78 which project inwardly a small distance into the relief opening 28 from respective side segments of member 26. The lugs 78 are engaged by adjacent surfaces of panel 30 during opening of the panel under an overpressure and serve to distribute forces more evenly across the panel 30 to achieve a sudden and unrestricted opening of the central part of panel 30.

Exemplary materials of construction for support members 26 and 44 and spacer plate 54 include stainless steel such as 304 stainless steel, Inconel, Monel or other exotic alloy depending upon the requirements of the particular installation. Panel 30, (as well as the alternate embodiments as described hereunder and illustrated in the drawings) may be fabricated of varying materials including but are not limited to 304, 304L, 316 and 316L stainless steel, aluminum, including aluminum 1100, 2024 and 6061, Hastelloy C276, Nickel, Monel and Inconel. The thickness of panel 30 may typically vary from about 0.005" to about 0.050" with the thickness increasing as the vent area increases and as the burst pressure of the vent increases. A coating may be provided over one side or both sides of the panel 30 for particular applications against corrosion is desired, with Teflon being an example of a suitable coating agent. The sealant material making up element 48 may be selected from a number of sealant compositions including Teflon (PFA, FEP, PTFE), silicone, rubbers, elastomers, ceramic materials.

Quadrate vent panel assemblies of this invention may range from rectangular shapes of from about 9"×12" to about 44"×69".

OPERATION OF ONE EMBODIMENT OF THE INVENTION

Unitary overpressure vent panel assembly 10 is a rigid, integrated, one-piece structure especially adapted to be supplied as a unit which meets a user's specifications and that may be secured in place on mounting frame 12 by simply tightening the nuts 74 of respective bolts 72. The gasket 58 is compressed against the outer flat face of mounting frame 22 to provide a fluid tight seal. The flexible element 48 which is compressed between panel 30 and secondary support member 44 also assures that the vent panel assembly 10 is leak proof when mounted in operating position on the wall 14 of bag house 12.

In the event an overpressure condition occurs within the interior of bag house 12 of sufficient magnitude to effect bursting of panel 30, the central section of the panel within the confines of relief opening 28 and aperture 46 gives way along the score lines 38, 40, 42 of score pattern 34 resulting in full opening of the panel. The trapezoidal segments of panel 30 on opposite sides of the central score line segment 38 fold outwardly in opposite directions while the triangular segments of panel 30 defined by V-shaped score line segments 40 and 42 likewise fold outwardly in opposite directions. The trapezoidal and triangular segments of panel 30 which open fold along the inner edges of relief opening 28 with the portions of the cover 30 between the extremities of V-shaped score line segments 40 and 42 functioning as hinges which preclude fragmentation of panel 30.

When full opening of the overpressure vent panel assembly 10 occurs as a result of an overpressure condition within the interior of the confined area to be protected such as bag house 12, the entire vent panel assembly 10 may be removed as a unit by simply removing nuts 74 whereupon the integrated assembly 10 may be pulled from the wall 14 of bag house 12 as one piece. Another overpressure vent panel assembly 10 of the same construction as the assembly that has just been removed may be fitted in place, again by simply inserting the replacement assembly 10 over bolts 72 followed by retightening the nuts 74.

The overall rigidity of overpressure vent panel assembly 10 in conjunction with assured internal sealing of the components of the integrated unit and the complete seal provided by gasket 58 against mounting frame 22 are important factors not only from the standpoint of ease of mounting and replacement of vent panel assembly 10, but also because of the inherent integrity of the unit and the manner in which it is mounted on the confined area to be protected from an overpressure.

Although the primary commercial utility for overpressure vent panel assembly 10 is protecting confined zones from overpressures resulting from uncontrolled explosions, vent panel assembly 10 may also advantageously be used for protecting an area from an overpressure condition that is less than an uncontrolled explosion. The condition that results in bursting of the vent panel in a protected zone may be an overpressure ranging from as little as one fourth psi or one half psi to as much as fifteen psi. It is necessary in these low pressure applications to use materials and closely control the fabrication of the vent panel in order to assure reliable bursting of the panel at a specified low pressure. In most instances, reliable opening of the vent panel at low overpressures can be obtained by the depth of the score pattern as well as the configuration of the score lines. In cases where it is undesirable to provide score lines in the vent panel for a particular application, a sharp object such as a knife blade may be provided in sufficient proximity to a relatively thin vent panel such that upon excursion of the panel toward the knife blade or sharp device when an overpressure is applied to the panel on the side thereof away from the knife or device, the blade or other sharp object severs the panel to effect immediate opening thereof.

ALTERNATE EMBODIMENTS OF THE INVENTION

FIG. 6 Embodiment

The unitary frameless overpressure vent panel assembly 110 of FIG. 6 is identical in construction to vent panel assembly 10 except that the panel 130 has a cross-shaped score line pattern 134 comprising intersecting linear line segments 1, 36 and 138 which extend to respective margins of the relief opening 128 in primary support member 126. In this instance, upon occurrence of an overpressure condition within a confined area protected by vent panel assembly 110, the panel 20 initially opens at the intersection of score line segments 136 and 138 whereupon the quadrate sections defined by line segments 136 and 138 fully open outwardly in opposite directions. The unscored areas of panel 130 within the confines of relief opening 128 act as hinges so that there is no fragmentation of panel 130 as it fully opens.

Figure 7:
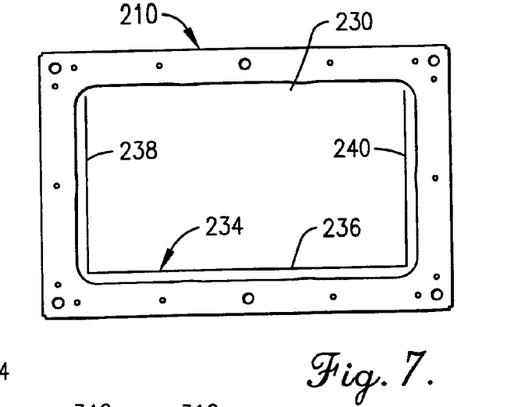
FIG. 7 is a plan view of a further embodiment of the overpressure vent panel assembly and showing an alternate score line configuration.

FIG. 7 Embodiment

The overpressure vent panel assembly 210 of FIG. 7 is identical in construction to vent panel 10, except for the provision of a U-shaped score pattern 234 in panel 230 which is presented by a central score line segment 236 connected to parallel score line segments 238 and 240 which are perpendicular to score line segment 236.

When the panel 230 is subjected to an overpressure adequate to effect bursting thereof, the central portion of panel 230 fully opens along score segments 236, 238 and 240 with the portion of cover 230 between the outermost ends of score line segments of 238 and 240 remote from score line segment 236 functioning as a hinge to prevent fragmentation of the panel 230.

Figure 8:
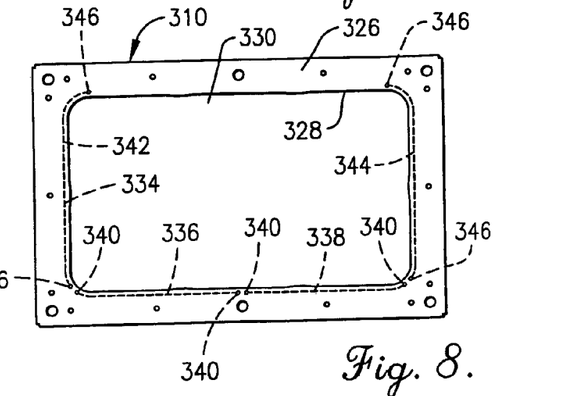
FIG. 8 is a plan view of another embodiment of the overpressure vent panel assembly and depicting a still further score line configuration.

FIG. 8 Embodiment

The overpressure vent panel assembly 310 of FIG. 8 is also identical to vent panel assembly 10 except for the score pattern 330, which is the presently preferred score pattern. In this instance, a U-shaped score line pattern 334 is located beneath the inner most edge of primary support panel 326 defining relief opening 328. The score line pattern 334 is defined by a pair of central score lines segments 336 and 338 each terminating in a perforation 340 while the side score line segments 342 and 344 terminate in respective perforations 346. The panel 330 fully opens in essentially the same manner when subjected to an overpressure adequate to effect bursting thereof, as panel 230. Here again, the portion of panel 330 between score line segments 336, 338, 342, 344 opens outwardly about a hinge line of panel 330 along the uppermost edge of relief opening 328 of primary support member 326.

Figure 9:
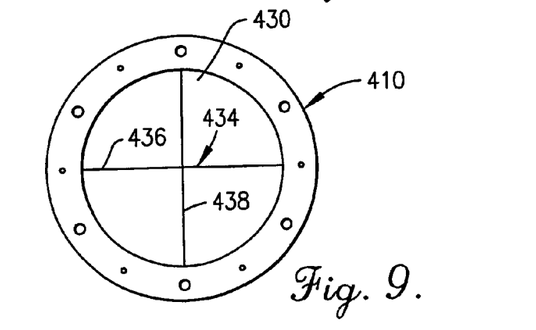
FIG. 9 is a plan view of a circular embodiment of the overpressure vent panel assembly.

FIG. 9 Embodiment

The overpressure vent panel assembly 410 of FIG. 9 is of the same construction as vent panel assembly 10 except that the assembly 410 is of circular configuration as depicted and the panel 430 of assembly 410 is provided with a cross-shaped score pattern 434 defined by intersecting score line segments 436 and 438 similar to the score pattern 134 of vent panel assembly 110. Full opening of vent panel assembly 410 takes place in the same manner as vent panel assembly 110. The diameter of the round vent panel assembly may vary typically from about 6" to about 44".

Although the vent panel assembly 410 as illustrated has a cross-shaped score pattern 434, it is to be understood that the panel may be provided with a variety of score patterns including a semi-circular score pattern in which a portion a portion of the disc is unscored to serve as a hinge upon opening of the disc, and other well known patterns as practiced in this art.

Figure 10:
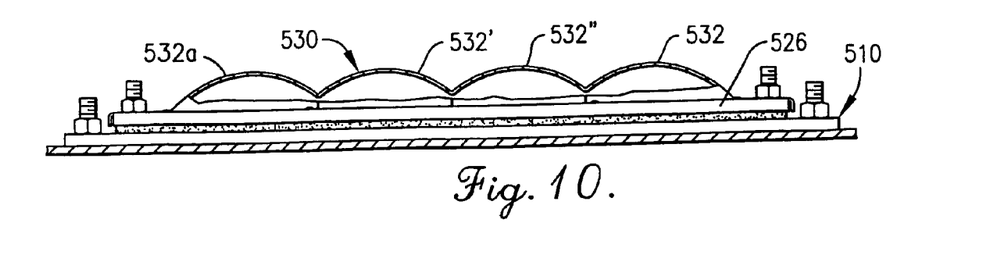
FIG. 10 is an enlarged fragmentary end view of an alternate embodiment of the overpressure vent panel assembly in which the vent panel is of the multiple dome type with the dome section of the panel being shown in section for clarity.

FIG. 10 Embodiment

The vent panel assembly 510 is of the same construction as vent panel assembly 10 except for the surface configuration of the vent panel 530. In this instance, the portion of vent panel 530 within the area of the relief opening (not shown) of primary support member 526 has a series of undulations defining side by side, parallel, bulged sections 532. Score lines segments may be provided if desired in panel 530 along the margins of intersection of respective bulge sections 532 with the deepest score line segment being between domed segments 532' and 532". The vent panel 530 having multiple dome sections 532 opens outwardly starting with the intersection between domed segments 532, 532a, 532', and 532" and the opposed portions of the panel 530 then fold outwardly in opposite directions with the portions of the panel 530 adjacent the side margins of the relief opening in primary support member 526 functioning as hinges so as to avoid fragmentation of the cover 530.

Minimum burst pressures for vent panel assemblies 10, 110, 210, 310, 410 and 510 range from a minimum of about ¼th psig to about 15 psig with more typical ranges being from about 2 psig to about 10 psig with the largest size vents having a minimum burst pressure of no more than about 0.5 psig to a maximum burst pressure of about 8-10 psig or higher. The maximum burst pressure is generally the same for all sizes of vent panel assemblies with the minimum burst pressure decreasing within the specified range as the size of the vent becomes larger.

FIG. 14 Embodiment

Viewing FIG. 14, a customer's vessel 80 has a cylindrical process flange 82 integral with vessel 80 and aligned with the opening 84 in the side wall of vessel 80. A circular unitary overpressure vent panel assembly 610 is clamped between flanges 82 and 86 and has an annular primary support member 626, a annular secondary support member 644, a circular vent panel 630 and an annular spacer plate 654 between panel 630 and spacer plate 654. An annular tubular, flexible element 648 is clamped between panel 630 and secondary support member 644. Annular gasket 658 is interposed between the secondary support member 644 and the opposed face of flange 82. A series of bolts 672 served to clamp the vent panel assembly between flanges 82 and 86.

The vent panel assembly 610 operates in the same manner as vent panel assembly 10 as described above.

Figure 15:
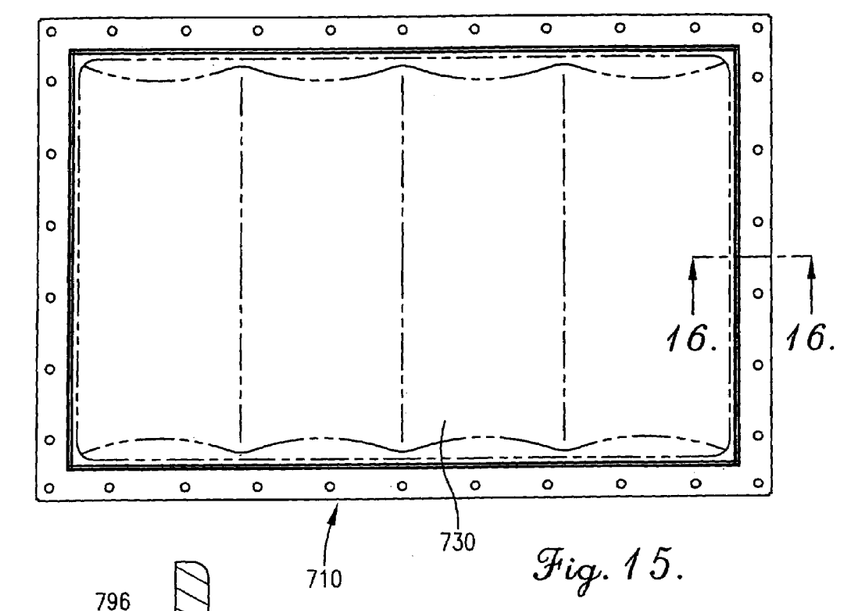
FIG. 15 is a plan view of an overpressure vent panel assembly in accordance with the present invention especially adapted for vacuum applications and having a vent panel provided with multiple dome construction.
Figures 16, 17:
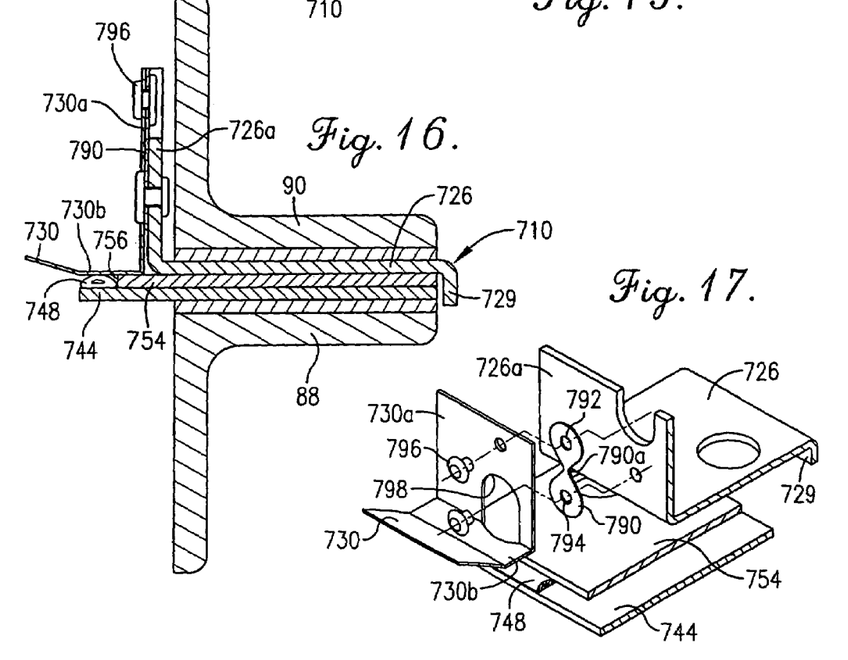
FIG. 16 is an enlarged fragmentary vertical cross-sectional view taken on the line 16-16 of FIG. 15 and looking in the direction of the arrows, illustrating a plurality of out-turned tabs that control opening of the central section of the vent panel shown in FIG. 15.
FIG. 17 is an enlarged fragmentary exploded view of a tab and associated structure as illustrated in FIG. 16.

Embodiment of FIGS. 15, 16 and 17

The overpressure vent panel assembly 710 illustrated in FIGS. 15 and 16 is especially adapted for vacuum applications and is shown as being clamped between the flange 88 of a customer's vessel or structure and an opposed flange 90. The primary support member 726 differs from the support member 26 principally in the provision of an upstanding quadrate flange 726a projecting away from the main body of support member 26 in a direction opposite the peripheral out-turned lip 729 of support member 26.

The vent panel 730 which for example may be of the multiple dome construction of panel 530 in the FIG. 10 embodiment has a plurality of out-turned tabs 730a (FIGS. 16 and 17) which overlie and complementally engage the inner surface of flange 726a. A tubular flexible sealant element 748 of cross-sectional shape as shown in FIG. 13 is interposed between the inner surface of vent panel 730 and the secondary support member 744 of vent panel assembly 710. The extent of compression of flexible sealant element 748 is controlled by the quadrate spacer plate 754 having a rectangular central opening 756.

A FIG. 8 shaped rupture strip 790 (FIG. 17) is interposed between each tab 730a and a proximal portion of the flange 726a of primary support member 726. Openings 792 and 794 are provided in opposite ends of each strip 790 between the reduced width mid-section 790a thereof. A rivet 796 carried by each tab 730a extends through the opening 792 of a respective strip 790 while another rivet 796 extending through opening 794 of each strip 790 and secured to flange 726a is received within a clearance slot 798 in each tab 730a.

The vent panel assembly 710 is especially adapted for use in protecting confined areas where a vacuum exists. In view of the fact that the outer most edge portion 730b of panel 730 rests on the inner edge of spacer plate 754, the multiple dome panel 730 resists collapse under the vacuum within the protected zone. The provision of a multiple domed vent panel provides improved resistance to reverse buckling of panel 730, even during cycling of the level of vacuum in the protected area.

In the event of an overpressure within the protected zone, and if that overpressure is sufficient to cause the restricted cross-sectional areas of strips 790 to sever, the panel 730 is released for immediate displacement from support between primary support member 26 and secondary support member 744.

As previously explained, the vent panel 730 has a hinge section on one of the long sides thereof to prevent fragmenting of the vent panel and allowing the pressure that is built up within the protected zone to escape through the opening provided by vent panel assembly 710.

What is claimed is:

1. A unitary overpressure vent panel assembly for a pressure relief area of a confined zone to be protected from the buildup of overpressures, said unitary vent panel assembly comprising:

a rigid, relatively thin, generally planar primary support member having a peripheral, circumscribing outer edge and an inner margin defining a central pressure relief opening;

a rigid, relatively thin, generally planar secondary support member adjacent said primary support member and having a peripheral, circumscribing outer edge and an inner margin defining a central relief aperture having dimensions approximately equal to the dimensions of the central relief opening;

a frangible vent panel interposed between the primary support member and secondary support member in closing relationship to the central pressure relief opening and the central relief aperture respectively, said vent panel being provided with a line of weakness between said primary support member and the secondary support member, the line of weakness being located inboard of the margins of the primary support member and the secondary support member respectively, said line of weakness having opposed spaced ends in a portion of the vent panel, the portion of the vent panel between said ends of the line of weakness defining a hinge for a central relief area of the vent panel that opens through said pressure relief opening along said line of weakness as a result of a predetermined overpressure on the vent panel;

flexible sealant material interposed between and engaging the vent panel and the secondary support member respectively and located inboard of the aperture margin of the secondary support member and outboard of the line of weakness in said vent panel, the flexible sealant material being disposed in circumscribing relationship to the relief aperture and providing a fluid-type seal between the vent and the secondary support member;

a planar intermediate spacer member interposed between and engaging the vent and the secondary support member, said spacer member having an innermost opening outboard of the flexible sealant material, said spacer member preventing compression of the flexible sealant material to an extent greater than the distance between the primary support member and the secondary support member;

a flexible sealing gasket on and extending around the outermost surface of said secondary support member remote from said primary support member; and connector structure fixedly interconnecting the primary support member, a portion of the vent panel outboard of the line of weakness therein, the intermediate spacer member, and the secondary support member to provide a rigid, relatively lightweight, unitary, one-piece, one-time overpressure vent assembly that is adapted to be installed, removed and replaced as a single unit over the pressure relief area of the confined zone.

2. A unitary overpressure vent panel assembly as set forth in claim 1 wherein said connector structure includes a plurality of mechanical fasteners extending through the primary support member, the spacer member, a peripheral portion of the vent panel, and the secondary support member.

3. A unitary overpressure vent panel assembly as set forth in claim 2 wherein said mechanical fasteners each comprise a rivet.

4. A unitary overpressure vent panel assembly as set forth in claim 1 wherein said sealing gasket is provided with spacer structure that limits the degree of compression of the sealing gasket when the vent panel assembly is installed over the pressure relief area of the combined zone.

5. A unitary overpressure vent panel assembly as set forth in claim 4 wherein is provided a series of bolts extending through the primary support member, the spacer member, a peripheral portion of the vent panel, and the secondary support member for securing the vent panel assembly to the confined zone, said spacer structure comprising a plurality of sleeves, each of said sleeves receiving a respective bolt.

6. A unitary overpressure vent panel assembly as set forth in claim 1 wherein said sealant material is a tubular, flexible sealant element trapping a quantity of a compressible fluid.

7. A unitary overpressure vent panel assembly as set forth in claim 1 wherein said support members and the vent panel are of generally quadrate, complemental configuration.

8. A unitary overpressure vent panel assembly as set forth in claim 1 wherein said support members and the vent panel are of generally circular, complemental configuration.

9. A unitary overpressure vent panel assembly as set forth in claim 1 wherein the portion of said vent panel aligned with the pressure relief opening of the primary support member and the aperture of the secondary support member is provided with a series of generally parallel undulations therein.

10. A unitary overpressure vent panel assembly as set forth in claim 9 wherein said support members are of generally quadrate configuration and said undulations define a plurality of side-by-side generally parallel, concavo-convex domed sections.

11. A unitary overpressure vent panel assembly as set forth in claim 10 wherein the concave surfaces of the panel are on one side of the panel and the convex surfaces of the panel are on the opposite side thereof.

12. A unitary overpressure vent assembly as set forth in claim 1 wherein said assembly is of quadrate configuration and said line of weakness includes a main central section, two leg sections extending from the main central section, and two in-turned segments joined to the extremities of the leg sections remote from the main central section, the in-turned segments being opposite the main central section of the line of weakness.

13. A unitary overpressure vent assembly as set forth in claim 1 wherein said line of weakness is defined by a series of separate lines having end extremities in which opposed extremities are in spaced relationship from one another.

14. A unitary overpressure vent assembly as set forth in claim 13 wherein is provided a perforation through the vent panel at each end extremity of the series of separate lines of weakness.

* * * * *